United States Patent [19]

Rothfjell

[11] 4,055,833
[45] Oct. 25, 1977

[54] METHOD OF DERIVING CHARACTERISTIC CONTOURS FROM A COLORED PICTURE

[76] Inventor: Rolf Eric Rothfjell, Luntmakargatan 52, Box 3254, S-103 65 Stockholm 3, Sweden

[21] Appl. No.: 585,668

[22] Filed: June 10, 1975

[30] Foreign Application Priority Data

June 14, 1974 Sweden .............................. 7407887

[51] Int. Cl.² .............................................. G06K 9/08
[52] U.S. Cl. ................................ 340/146.3 E; 40/2.2; 235/61.7 B; 354/103
[58] Field of Search ................. 340/146.3 E, 149 A; 235/61.7 B; 354/102, 103, 104, 109; 35/28; 40/2.2

[56] References Cited

U.S. PATENT DOCUMENTS

| | | | |
|---|---|---|---|
| 2,082,579 | 6/1937 | Jacobsen | 354/104 |
| 3,715,962 | 2/1973 | Yost, Jr. | 354/103 |
| 3,805,238 | 4/1974 | Rothfjell | 340/146.3 E |

Primary Examiner—Leo H. Boudreau
Attorney, Agent, or Firm—Stevens, Davis, Miller & Mosher

[57] ABSTRACT

A method of deriving characteristic curves from a colored photograph of an object, which comprises making an image comprising only one of the basic colors of the colored photograph, the contrast of said image being enhanced, so that only the areas of the object which are most strongly colored in said color are reproduced.

5 Claims, 4 Drawing Figures

METHOD OF DERIVING CHARACTERISTIC CONTOURS FROM A COLORED PICTURE

The present invention is concerned with a method of deriving characteristic contours or curves from a colored photographic picture, in particular for deriving characteristic contours or curves from the face of an individual to prepare an identity document.

The U.S. Pat. No. 3,805,238 is concerned with a method of using curves or points derived from one or more images of a person's face, as characteristic features on which an identification is based. The patent describes several methods of utilizing these characteristics, the main importance of which is that it may be made use of in a relatively simple manner for identifying persons by the aid of or with the assistance of computers. Among other methods, the patent discloses a procedure which comprises disposing such curves on an identity card or document in such positions that they may be visually compared to corresponding facial images from which the curves have been derived and also may be read by means connected to a computer. For example, the curves may be disposed on the rear side of the card in positions coinciding with the image contours to which they correspond, whereby visual comparison may easily be made in transmitted light.

The present invention is directed to a simple and readily practicable method of deriving the requisite curves representing characteristic contours in conjunction with the preparation of an ordinary colored photograph.

The invention is based on the principle that an image is prepared which comprises only one of the basic colors present in the colored photograph, said image being prepared with an increased constrast so that areas of the object having weak shades of the selected basic color are suppressed and only the more strongly colored areas are recorded. This will result in an image comprising areas of the selected color on a neutral (white) background, and the outlines of such areas may serve as the desired curves.

It is particularly preferred to select the blue color which is present above all in shadows on the image; thus an image made in this manner will show contours which are most naturally noticed in an image of a person's face.

The method according to this invention makes it possible to produce the curves required for identification according to U.S. Pat. No. 3,805,238 directly when a colored photograph is prepared without any additional working steps being required.

The simplified monochromatic image may be obtained by using a special camera which by means of suitable lenses and color filters is adapted to take a complete colored image and a one-colored image juxtaposed to each other on the same photographic medium. The contrast can be increased when the photograph is taken or by applying suitable measures in the developing or printing process.

It is also possible to start from a negative or positive colored image and make a print thereof such that only one of the three colors is reproduced, while contrast is increased. The resulting copy is combined with the complete colored image in the desired manner, e.g. by being disposed beside of or on the back of the complete image on a card or other identification document.

The invention will be described more in detail with reference to the accompanying drawings which illustrate the process of the invention.

Figure 1:
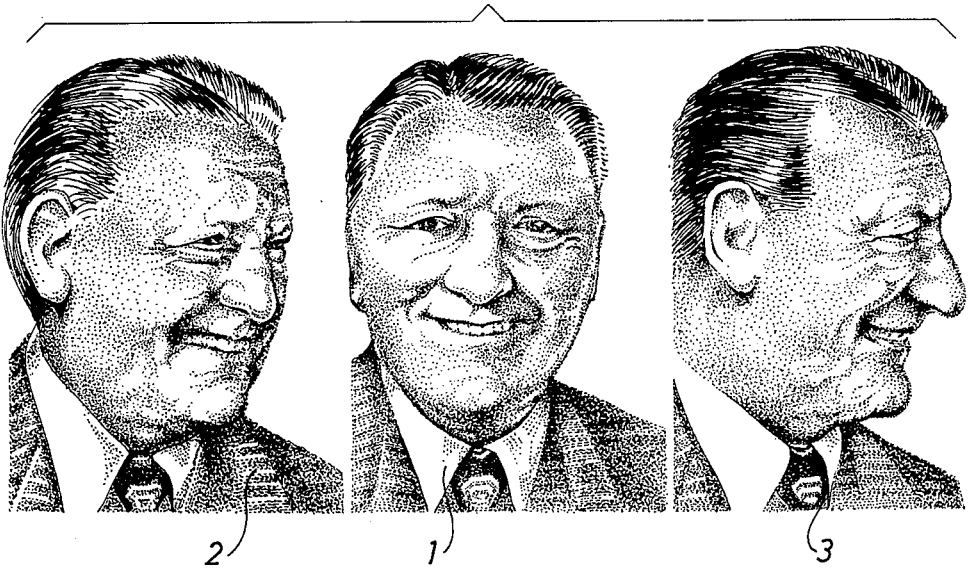
FIG. 1 shows a series of photographic pictures taken of an individual.

With reference to the drawings, FIG. 1 illustrates a series of life-like photographs of a person, i.e. a series of conventional photographs, which although shown in black and white should be thought of as colored images. In principle, the photographs can be taken with any suitable camera, using a conventional film, from which copies can be made in the normal manner. The film may be color film of normal sensitivity, such as the well known commercially available films produced by AGFA or Kodak, for example. The film is developed by conventional methods.

The series of photographs illustrated in FIG. 1 show the same person in three different positions. The series comprises a full-face photograph 1, a photograph 2 taken at an angle of about 45° and a photograph 3 taken in profile. While the example illustrated herein comprises three views taken at different angles, it should be understood that any number of such photographs (from one on up) may be sufficient in various embodiments of the invention.

Figure 2:
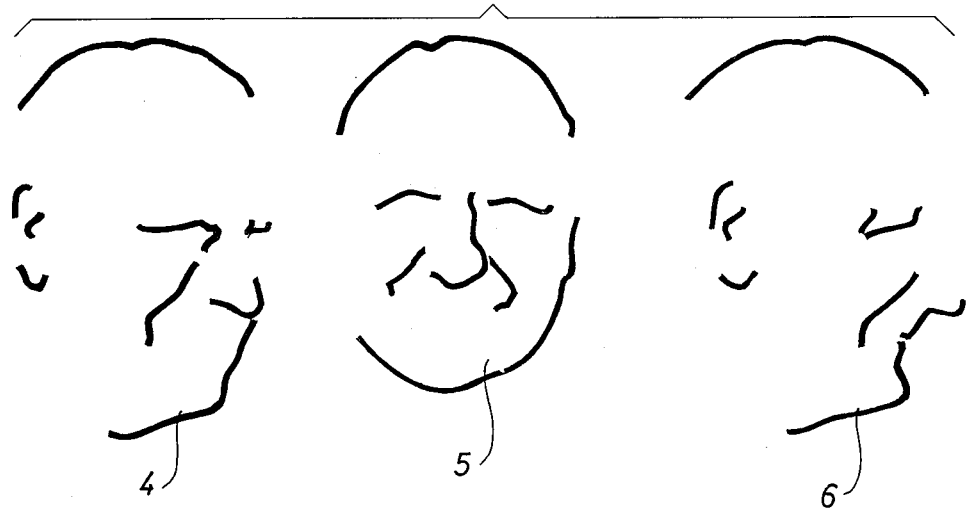
FIG. 2 shows a series of pictures derived from the pictures in FIG. 1 by the process of this invention.

FIG. 2 shows images 4, 5, 6 which reproduce only the darker areas of the photographs of FIG. 1. These images may be prepared by copying the photographs in a manner such that only the blue portions of the photographs are reproduced and at the same time increasing the contrast so that the copies contain only dark colored areas on an essentially neutral (white) background.

Figure 4:
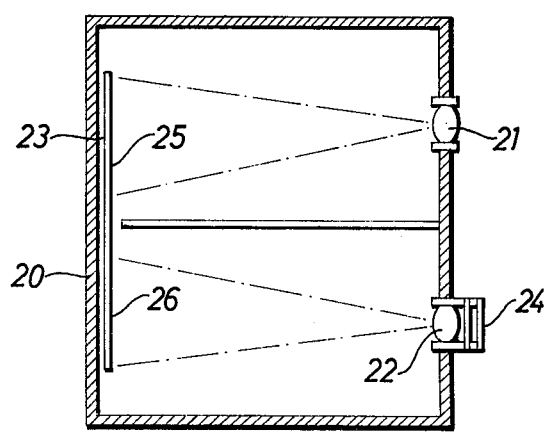
FIG. 4 is a diagrammatic view of a camera by which the images used in accordance with the invention can be produced.

The images depicted in FIGS. 1 and 2 may also be prepared by means of a camera arranged as shown diagrammatically in FIG. 4. The camera 20 has two lens systems 21 and 22 arranged to project images simultaneously on two different areas of a color film 23 as shown. The lens system 21 provides the normal multicolor picture, while lens system 22 is provided with suitable filters 24 which transmit only the blue light and at the same time increase the contrast, the two lens systems are provided with suitable shutters (not shown) operated simultaneously, so that the same time as the normal color picture is recorded in the area 25 of the film, a corresponding blue picture is recorded in the area 26. The film may then be developed and copied in the normal manner, and will then show a first series of normal color pictures of the type shown in FIG. 1 of a number of persons along one edge thereof and a corresponding series of blue pictures similar to those shown in FIG. 2 in positions corresponding to those of the first series along the other edge thereof.

Figure 3:
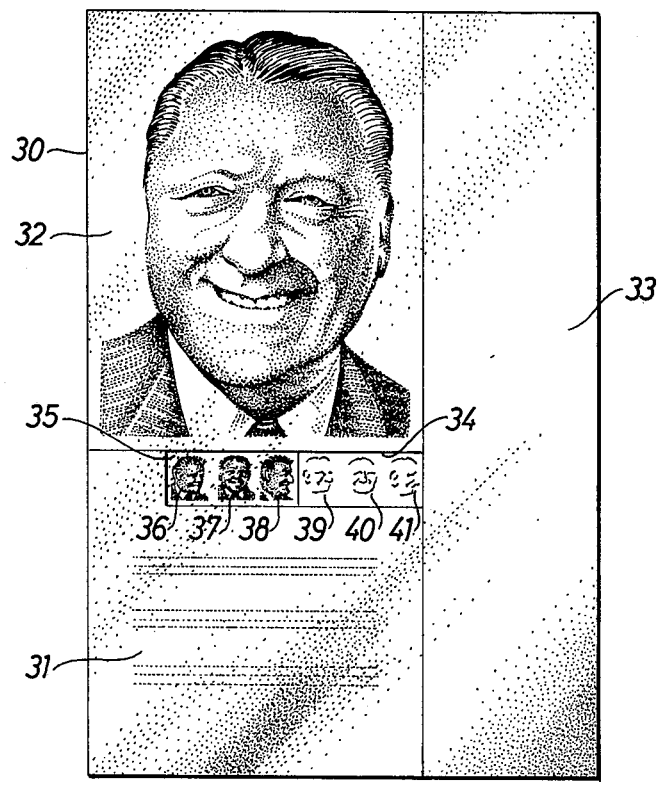
FIG. 3 shows an identity card incorporating pictures produced in accordance with this invention.

An example of an identity card according to the invention is shown in FIG. 3.

The card 30 is in a usual manner provided with an image 32 of the person to whom the card pertains, in this case corresponding to the picture 1, a text portion 31 comprising information of the person (name, address, registration number, employment etc.) and an area 33 containing other information, such as legitimacy, the party having issued the document etc. A window 34 is provided in the card 30 and therein is disposed a piece of microfilm 35 which carries three images 36, 37, 38 of the person corresponding e.g. to the images 1, 2, 3 in FIG. 1 and three pictures 39, 40, 41 corresponding to the images 4, 5, 6 in FIG. 2.

I claim:

1. A method of producing an identity document comprising the steps of making corresponding multicolored and blue monochromatic photographs of the face of a person to be identified, the monochromatic photograph being made with the contrast of the image enhanced so that only areas of great color intensity are reproduced, and mounting both photographs on a support.

2. The method of claim 1 in which the multicolored and the monochromatic photographs are taken simultaneously.

3. The method of claim 1 in which the monochromatic photograph is made from the multicolored photograph.

4. An identity document comprising a support mounting corresponding multicolored and monochromatic photographs of the face of the person to be identified, the monochromatic photograph having been made with the contrast of the image enhanced so that only areas of great color intensity are reproduced.

5. The identity document as claimed in claim 4 having corresponding multicolored and monochromatic photographs of the face from a plurality of different points of view.

* * * * *